(12) United States Patent
Yu Chen

(10) Patent No.: US 6,574,816 B2
(45) Date of Patent: Jun. 10, 2003

(54) EMERGENCY TOOL FOR AUTOMOBILES

(76) Inventor: Hsiu-Man Yu Chen, No. 27, Sec 11, Ta Fu Rd., Tan Tzu Hsiang, Taichung (TW), 427

(*) Notice: Subject to any disclaimer, the term of this patent is extended or adjusted under 35 U.S.C. 154(b) by 57 days.

(21) Appl. No.: 09/964,325

(22) Filed: Sep. 28, 2001

(65) Prior Publication Data

US 2003/0061665 A1 Apr. 3, 2003

(51) Int. Cl.[7] .................................................. B25F 1/00
(52) U.S. Cl. ................................. 7/100; 7/144; 7/158
(58) Field of Search ........................... 7/100, 144, 158, 7/165

(56) References Cited

U.S. PATENT DOCUMENTS

| | | | | | |
|---|---|---|---|---|---|
| 4,363,147 A | * | 12/1982 | Deweese | ........................ | 7/158 |
| 5,251,351 A | * | 10/1993 | Klotz | ........................... | 7/100 |
| 5,642,567 A | * | 7/1997 | Lin | ................................ | 7/100 |
| 6,324,762 B1 | * | 12/2001 | Huang | .......................... | 7/165 |
| 6,454,430 B1 | * | 9/2002 | Lin | ................................ | 7/100 |

\* cited by examiner

Primary Examiner—James G. Smith
(74) Attorney, Agent, or Firm—Troxell Law Office PLLC

(57) ABSTRACT

An emergency tool for automobiles includes an elongate body, a rear cap resilient and pivotally connected to a rear end of the elongate body, an upper cover closing on an open upper portion of the body, a knife device combined with a front end portion of the body for cutting a seat belt in case of emergency, and a hammer combined sidewise with an projection formed in the front end portion of the body for breaking open a window glass. Two different screwdrivers and a connect rod of a screwdriver set are deposited inside the body, possible to be taken out for use in case of an accident by opening the rear cap and the upper cover.

8 Claims, 4 Drawing Sheets

EMERGENCY TOOL FOR AUTOMOBILES

BACKGROUND OF THE INVENTION

This invention relates to an emergency tool for automobiles, particularly to one having various uses in case of an accident of an automobile.

Automobiles are indispensable transporting tools for almost every one, and having a connecting device for a seat belt, which will be deformed in case of an accident so that the seat belt may not be able to be removed from the body of a driver. Then the driver has to wait someone to come to help remove the seat belt.

A known conventional knife for cutting a seat belt commonly has two handles and a knife placed between the two handles, only having one purpose of cutting a seat belt. Other tools such as a screwdriver or hammer may be very useful in case of an accident for a driver of an automobile.

SUMMARY OF THE INVENTION

The objective of the invention is to offer an emergency tool for automobiles provided with a screwdriver placed in a rear cap of the emergency tool, and it can be taken out for use by pulling rearward the rear cap and then rotated for 90°. Then an upper cover of the emergency tool can be screwed open with the screwdriver, without trouble of finding an extra screw.

The feature of the invention is a knife device fixed with a front end portion of the emergency tool for cutting a seat belt, a screwdriver set, and a hammer provided with another side of the knife for break a window glass of an automobile if needed in case of persons closed in an automobile in an accident.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
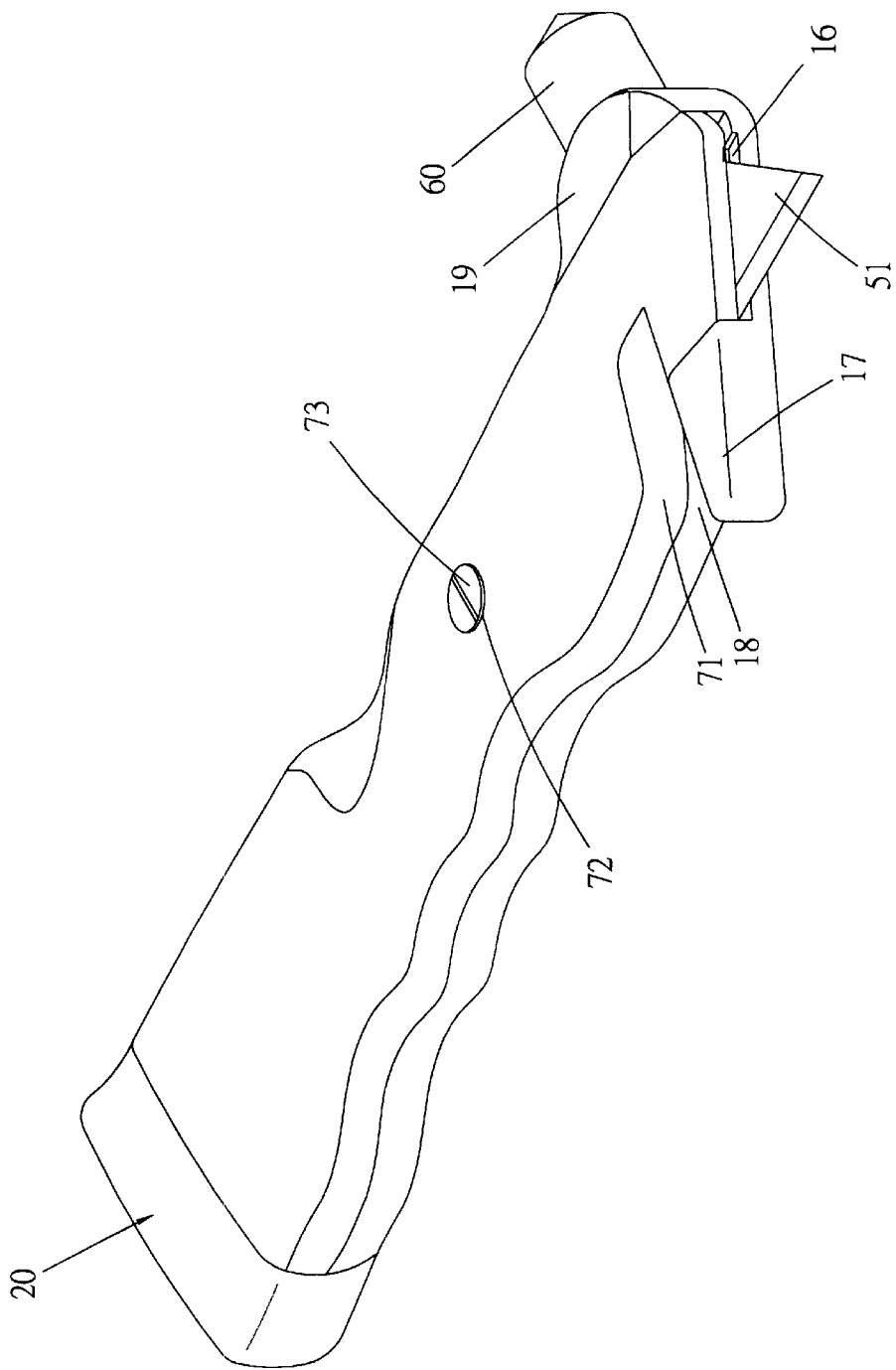
FIG. 1 is a perspective view of an emergency tool for automobiles in the present invention.

A preferred embodiment of an emergency tool for automobiles in the present invention, as shown in FIGS. 1, 2, 3 and 4, includes an elongate body 10, a rear cap 20, an interactive rod 30, a screwdriver set 40, a knife device 50, a hammer 60 and an upper cover 70 as main components combined together.

The elongate body 10 has an upper substantial opening, a rear plate 11, a shaft hole 111 formed in a center section of the rear plate 11, two parallel engage posts 112 located at two sides of the shaft hole 111, two insert posts 113 respectively located at an outer side of each engage post 112, and a separating plate 12 with a hole 121 provided vertically in the center section.

A first semi-circular groove 14 is formed at a right side of the rear plate 11 and opening upward, and a first room 131 is formed in front of the semi-circular groove 14, and a second semicircular groove 14 is formed at a left side of the rear plate 11. A second room 132 is formed in front of the second semicircular groove 14, having a length longer than the first room 131. The body 10 has also a third room 133 formed in an intermediate portion at a right side, having also a third semicircular groove 14 in a sidewall of the third room.

Figure 2:
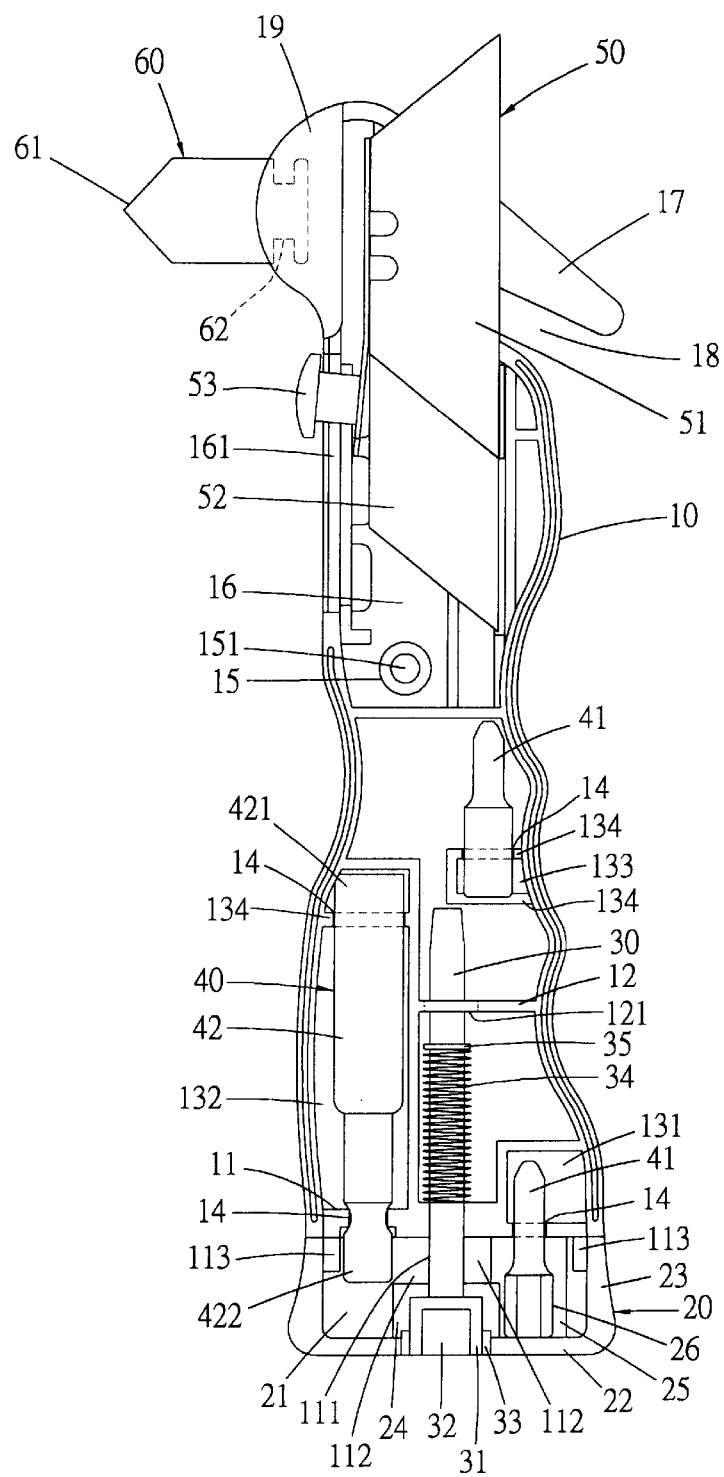
FIG. 2 is a cross-sectional view of the emergency tool for automobiles in the present invention.
Figure 3:
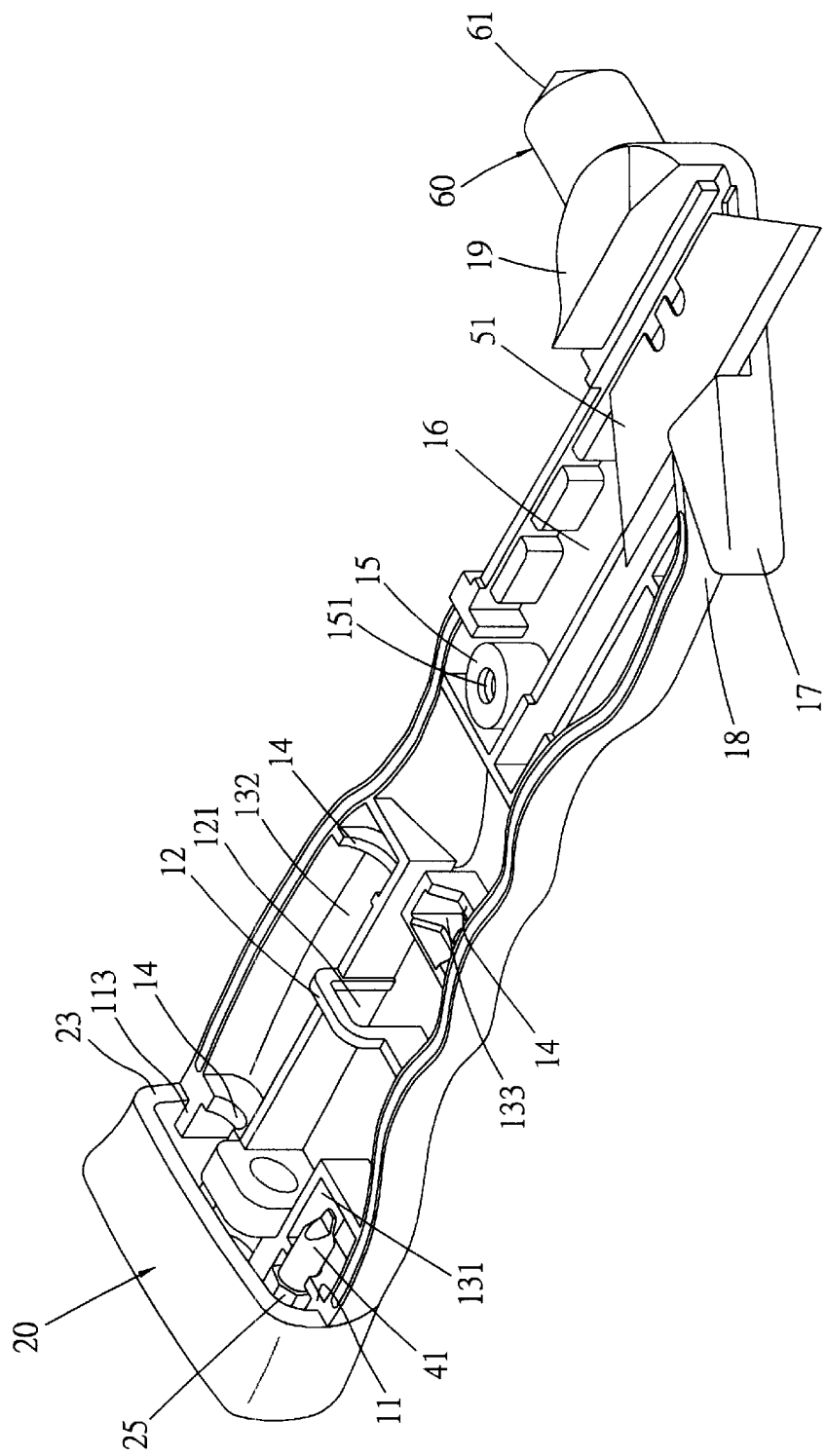
FIG. 3 is perspective view of a bottom plate of the emergency tool for automobile in the present invention; and, FIG. 4 is a perspective view of a rear cap of the emergency tool rotated for 90° in the present invention.

As shown in FIGS. 2 and 3, the body 10 further has a round post 15 with a threaded hole 151 in its center.

A knife hole 16 is formed from the center of the intermediate portion to a front end, and a slide groove 161 is formed in a left side edge if the knife hole 16 as shown in FIG. 3, and a protective plate 17 of nearly a triangle shape is formed in a right side of the front end of the body 10, and a seat belt cutting opening 18 is formed behind the protective plate 17 and communicating with the knife hole 16. Further, the body 10 has a nearly semicircular projection 19 at the left side of the front end.

The rear cap 20 is combined with the rear end of the body 10, having an hollow room 21 surrounded by two long walls 22 and two short walls 23, and a fix base 24 formed in the center bottom of the hollow room 21, and an insert base 25 with a central hexagonal hole 26 formed beside the fix base 24 and facing the first room 131.

The interactive rod 30 is made of metal, having a driving head 31 of comparatively large dimensions formed in a lower end and bored with a central hexagonal hole 32. The driving head 31 is formed integral with the rear cap 20 during injecting forming process of the rear cap 20 by means of two fixing blocks 33. Then the hexagonal hole 32 located in the bottom center faces outward. The interactive rod 30 has its front end protruding through the shaft hole 111 of the rear plate 11 and then passes through a center hollow of the spring 34 and through the hole 121 of the separating plate 12, with the spring 34 fixed firmly by a C-shaped fixer. Then the rear cap 20 is kept immovable in place resiliently.

Figure 4:
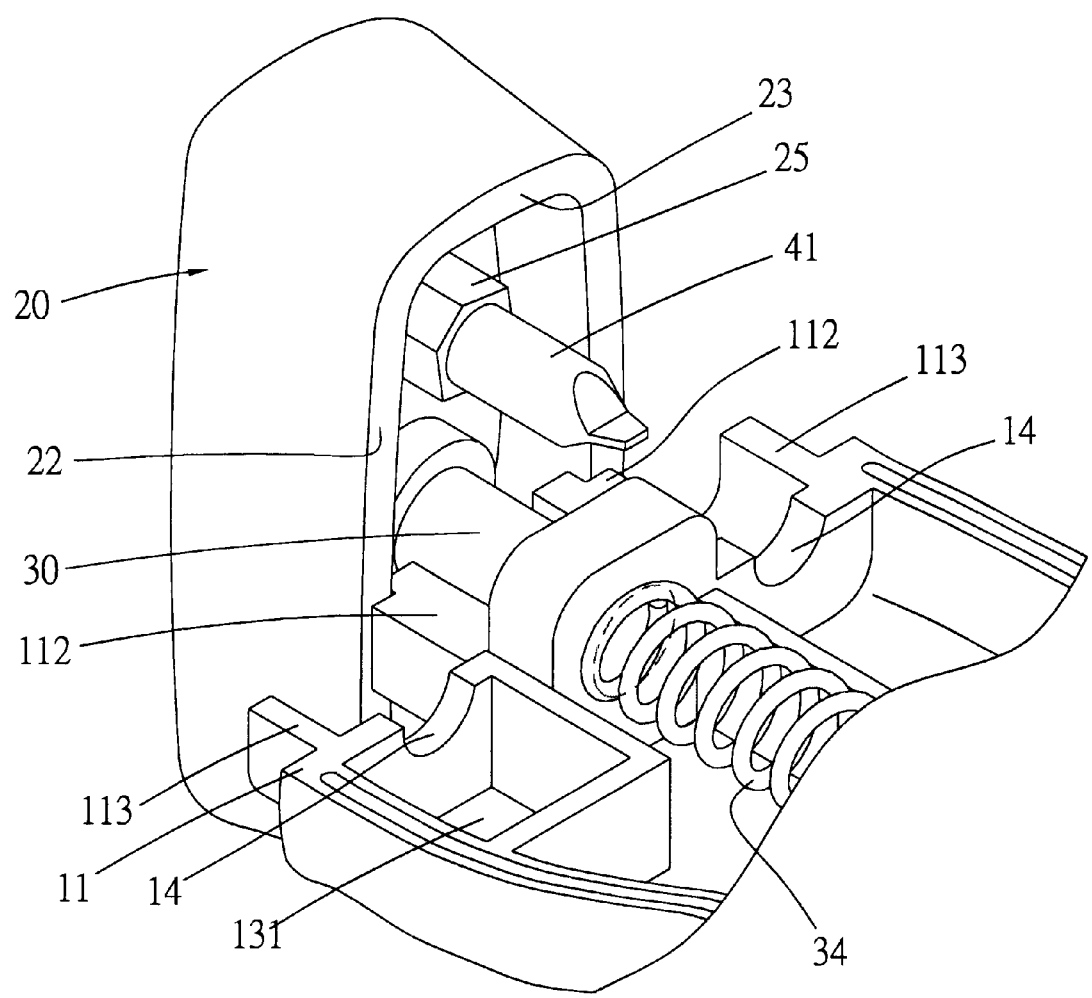

The screwdriver set 40 is composed of two screwdrivers 41 and a connecting rod 42, and as shown in FIG. 4, a first screwdriver 41 is deposited in the hexagonal hole 26 of the insert base 25, with its rear end extending through the first semicircular groove 14 and in the first room 131. A second screwdriver 41 is deposited on the fourth semicircular groove 14 of the separating plate 134 of the second room 132. The connecting rod 42 is deposited on the second semicircular groove 14 of the separating plate 134 of the second room 132 and in the second room 132. The connecting rod 42 has a hexagonal socket 421 formed in an upper end and a hexagonal hole 422 formed in a lower end.

The knife device 50 consists of a knife blade 51 movable in the knife hole 16 and along the slide groove 161 and a handle 52 connected to the knife blade 51, and a push button 53 protruding the slide groove 161 and connected with the handle 52 to move the handle 52 and the knife blade 51 to slide back and forth, letting the rear end of the knife blade protruding out of knife hole 16 and the body 10. The art of connecting the push button 53, the handle 52 and the knife blade 51 is well known and the same as an art knife, so its detail is omitted here. Only one point to mention is a fluorescent material is coated on the surface of the push button, enable the push button visible even in a dark light for easy handling.

The hammer 60 is made of metal, having a pointed front end 61 extending sidewise, and an annular groove 62 of a certain width formed near a rear end, with the annular groove 62 firmly connected with the projection 19 of the body during injecting molding process of the body 10.

The upper cover 70 is shown in FIG. 1, covering on the upper hollow portion of the body 10, with the bottom being flush with the rear plate 11, not covering the two engage posts 112 and the insert posts 112. Further, the front end of the upper cover 17 is located between the protective plate 17 and the projection 19 of the body 10, with its upper surface flush with the upper surfaces of the both, the protective plate 17 and the projection 19. Further, the upper cover 70 has a cutting groove 71 of the same shape as the cutting groove 18 behind the projective plate 17, as shown in FIG. 2, communicating with the knife hole 16 to permit a seat belt to be pushed therein for the knife blade 51 to cut the seat belt. Further, the upper cover 70 has a lock hole 72 corresponding to the threaded hole 151 of the round post 15 of the body 10 for a screw 73 to engage through and with the threaded hole 151 to firmly combine the upper cover 70 with the body 10.

Provided that a driver wants to cut a seat belt worn on the driver's body, owning to impossibility of releasing the safety band, the cutting grooves 18 and 71 of the emergency tool is moved toward the safety band to let the knife blade 51 in the knife hole 16 cut the safety band, without any danger.

Should any other thing is to be cut, then as shown in FIG. 2, push the push button 53 to push the knife blade 51 move out properly of the knife hole 16, then the knife blade 51 can be used for the purpose.

Then one of the screwdrivers 41 is wanted to be used, as shown in FIGS. 2 and 4, pull backward to let the C-shaped fixer 35 compress the spring 34 until the rear cover 20 separates from the insert posts 113, and then rotate the rear cap 20 for 90° and then release the rear cover 20. Then the spring 34 recovers its resilience to pull back the rear cover 20, with the inner walls of the two long walls 22 engage the two engage posts 112 stabilizing the rear cap 20 at the posit ion rotated for 90°. At this time, the screwdriver 41 placed in the hexagonal hole 26 of the engage base 25 may be taken out for using to unscrew the screw 70 to take off the upper cover 70. The tightness of the screw 73 is in the scope of manual handling of a screwdriver.

The hammer 60 combined with the projection 19 of the body 10 can break open a glass window of an automobile in case of an accident to as to let persons unable to get out of a door of an automobile to escape out through the glass window broken, functioning as an important tool in case of emergency.

The provision of the rear cap 20 can save a trouble for finding a screwdriver as the screwdriver 41 can be taken out by pulling rearward and then rotating for 90° the rear cap 20. Then the upper cover can be screwed open by the screwdriver 41 for the other screwdriver 41 and the knife device 50 possible to be used for cutting a seat belt or any other matters. Therefore, the emergency tool for automobiles has various tools to be separately used in case of an accident of an automobile.

I claim:

1. An emergency tool for automobiles comprising:

An elongate body having an upper open portion, an elongate bottom plate, a knife hole formed in a center section of a front-end portion, a seat-belt-cutting groove formed in one side of the front portion and communicating with said knife hole;

A rear cap combined with a rear end of said elongate body, having a hollow room, an insert base formed at one side of said hollow room, said insert base having a hexagonal hole in its center for receiving one of two screwdrivers;

An interactive rod having a driving head with a center hexagonal hole formed in a lower end, said driving head located in the hollow room of said rear cap with the hexagonal hole facing outward, a body of said interactive rod resiliently connected pivotally to a rear end of said elongate body, said rear cap possible to be pulled outward and then rotated for 90° and stabilized in that position or stabilized in its original position resiliently;

An upper cover covering the open upper portion of said elongate body, and screwed tightly with said body;

Said screwdrivers placed in the hexagonal hole of said insert base possible to be taken out by pulling said rear cap and said interactive rod and then said rear cap rotated for 90° for unscrew said upper cover from said body.

2. The emergency tool for automobiles as claimed in claim 1, wherein said bottom plate is provided with two engage posts extending rearward, and two insert posts respectively at an outer side of each said engage post, said hollow room of said rear cap is defined by two long walls and two short walls, inner walls of said two short walls engaging outer surfaces of said two insert posts to let said rear cap close the rear end of said elongate body, and inner walls of said two long walls engage said engage posts to keep immovable said rear cap at the 90° position.

3. The emergency tool for automobiles as claimed in claim 1, wherein said bottom plate has a semicircular groove formed in a rear end of a right side, and a first room formed in front of said semicircular groove for receiving one of the two screwdrivers of said screwdriver set.

4. The emergency tool for automobiles as claimed in claim 3, wherein said another semicircular groove is provided at a left side of said bottom plate, and a second room is formed in front of the other semicircular groove for depositing a connect rod.

5. The emergency tool for automobiles as claimed in claim 1, wherein said elongate body has a nearly semicircular projection formed at one side of the front end portion for combining with a hammer.

6. The emergency tool for automobiles as claimed in claim 5, wherein said hammer has a pointed front end and an annular groove formed near an opposite end for combining with said projection firmly.

7. The emergency tool for automobiles as claimed in claim 1, wherein said knife hole of said body extends to the front end for said knife blade placed therein possible to slide outward to protrude out of said body.

8. The emergency tool for automobiles as claimed in claim 5, said elongate body further has a nearly triangle protective plate formed at another side of said front end portion, and said upper cover has its front end fitted between said protective plate and said projection in flush upper surfaces.

* * * * *